Patented Apr. 12, 1932

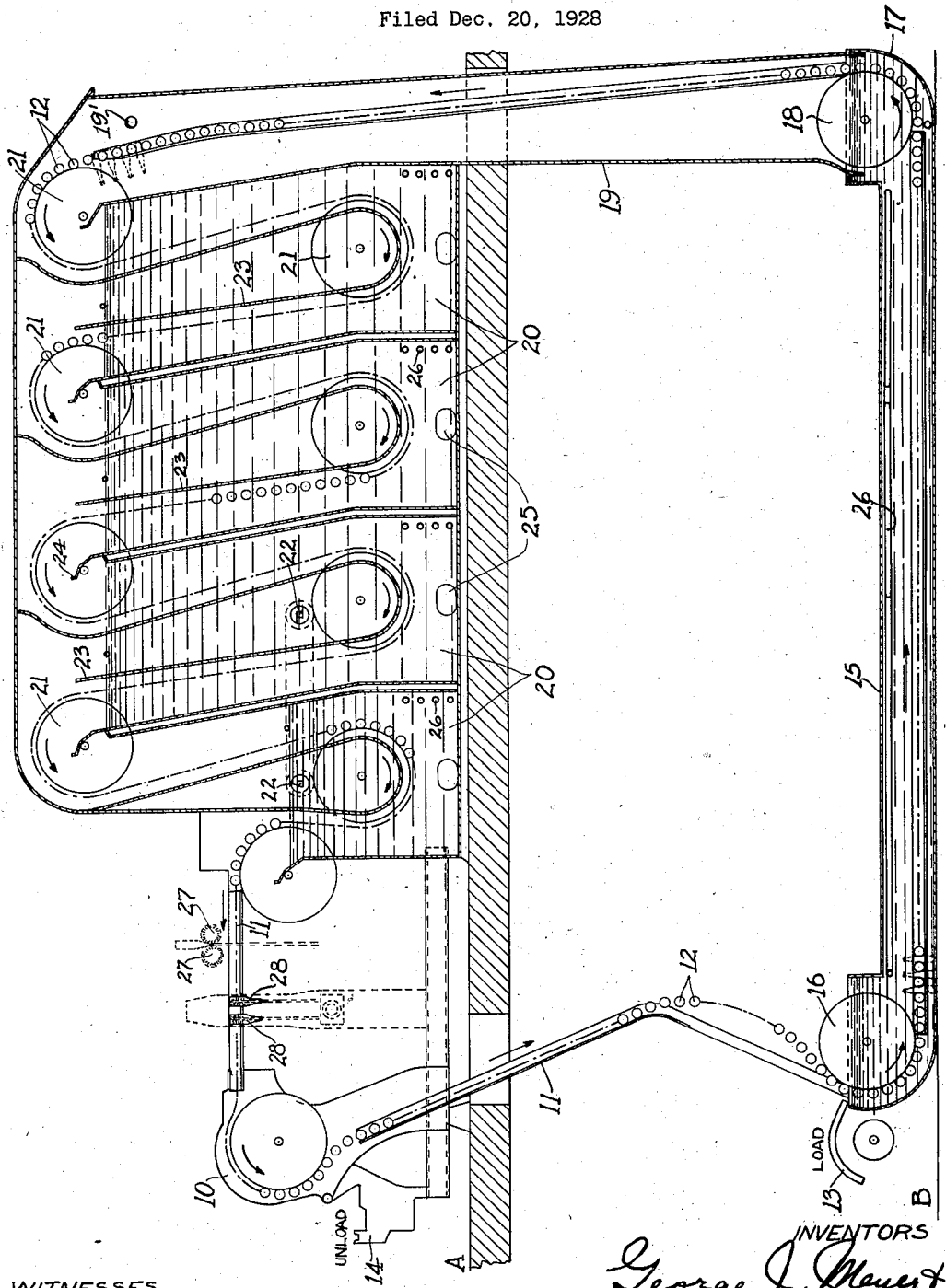

1,853,917

UNITED STATES PATENT OFFICE

GEORGE J. MEYER, OF MILWAUKEE, WISCONSIN, AND GEORGE L. N. MEYER, OF JACKSON HEIGHTS, NEW YORK, ASSIGNORS TO GEO. J. MEYER MANUFACTURING COMPANY, OF CUDAHY, WISCONSIN, A CORPORATION OF WISCONSIN

BOTTLE SOAKING AND CLEANING MACHINE

Application filed December 20, 1928. Serial No. 327,243.

The invention relates to bottle cleaning machines of the type in which the bottles are soaked before they are washed.

In certain types of large capacity bottle cleaning machines incorporating a soaker through which an endless bottle conveyor passes, it has been the practice to extend the conveyor in such manner that the machine as a whole occupies space on two floors in order to facilitate loading and unloading operations. In many cases the loading station is located at the lower floor and the unloading station at the upper floor, although in some instances both loading and unloading stations were at the upper floor while the major portion of the machine was at the lower floor. In any case the return flight of the conveyor leading to the soaker is of considerable length and this flight of the conveyor has heretofore been idle.

In order to substantially increase the soaking capacity of a machine of this type without increasing the floor space, or to obtain the same soaking capacity in a machine occupying less floor space, it is an object of the invention to provide a supplemental soaking tank through which the return flight of the bottle conveyor passes on its way to the soaker for effecting a preliminary soaking operation.

Another object of the invention is to arrange the soaker of the bottle cleaning machine on one floor and to arrange on the floor below the supplemental soaking tank through which the return flight of the loaded conveyor passes on its way to the soaker.

A further object of the invention is to provide means for heating the bottles rapidly and without danger of breakage in the rising flight of the conveyor leading from the supplemental soaking tank to the soaker, this being accomplished by a steam compartment enclosing the rising flight of the conveyor, thus dispensing with the use of additional soaking compartments.

A further object is to employ the supplemental soaking tank for effecting a water seal at the lower end of the steam compartment.

The invention further consists in the features hereinafter set forth and more particularly defined by the annexed claims.

The accompanying drawing shows a longitudinal sectional elevation of a bottle cleaning machine constructed in accordance with this invention.

In this drawing, the numeral 10 designates a frame of suitable construction including angle and channel guides 11, on which travel the rollers 12 of conveyor chains. The conveyor chains carry transversely extending rows of bottle-holding pockets in the manner shown in United States Letters Patent No. 1,429,960, granted September 26, 1922, and form therewith an endless bottle conveyor. The bottle conveyor is moved by any suitable means in a manner hereinafter described for causing the conveyor to travel in its guides in the direction indicated by arrows.

In that embodiment of the invention shown in the drawing, the conveyor includes an upper horizontal flight on one floor A and a lower horizontal return flight on floor B therebelow, these horizontal flights being connected by a descending angular flight at one end of the machine. A loading device 13 of any suitable construction is disposed adjacent the descending flight of the conveyor at floor B for feeding bottles into the pockets of the conveyor and this device may be either manually or automatically operated. An unloading device 14 of any suitable construction is disposed adjacent the descending flight of the conveyor at floor A for discharging clean bottles from the conveyor. The descending conveyor flight between the unloading device and the loading device is empty and any slack in the conveyor may accumulate at the lower portion of this flight.

The horizontal return flight of the conveyor on floor B is disposed within an elongated shallow soaking tank 15 containing a cleaning solution in which the bottles are given a preliminary soaking during the first portion of their travel from the loading station. The portion of the bottle conveyor entering one end of the soaking tank is carried on guide wheels 16 engaging the conveyor rollers 12. The bottles pass through the preliminary soaking tank 15 in an upright position in which they are completely filled and in which they slide along the bottom of the tank. The preliminary soaking tank 15 is preferably of enclosed construction, as shown, with entrance and exit wells at opposite ends, although in some instances an open tank may be employed. The level of the solution in the end wells is at some distance above the top wall of the tank, thereby increasing the soaking capacity for a given length of tank and for a given quantity of solution.

At the end of the preliminary soaking tank 15 opposite the loading station, the bottle conveyor travels upwardly from the solution in an inclined flight, the bottles in the first portion of their upward travel being prevented from leaving the conveyor by reason of their engagement with the curved end wall 17 of the tank. At this end of the tank the conveyor is carried on guide wheels 18. Above the solution level in the tank 15 the bottles in the upwardly moving inclined flight of the conveyor are tilted downwardly in order to empty them of solution which drops back into the preliminary soaking tank. The labels which have been loosened from the bottles in the preliminary soaking operation are removed from the soaking compartment 15 in any suitable manner.

The rising inclined flight of the bottle conveyor leads from the preliminary soaking tank on floor B to a soaker arranged on the upper floor A and in which the main soaking operation takes place, the bottles moving through the soaker in a general direction opposite to that in which they move in the lower horizontal flight of the conveyor on floor B. In order to heat the bottles in their passage from the preliminary soaking tank to the soaker on the floor thereabove, the rising flight of the bottle conveyor is enclosed in a steam compartment 19, the upper end of which is connected with the soaker and the lower end of which has a water seal in the outlet end of the preliminary soaking tank. This water seal may be obtained either by submerging the lower walls of the steam compartment into the soaking tank, or by directly securing the steam compartment walls to the walls of the soaking tank. The steam compartment or chamber 19 is filled with steam at about atmospheric pressure by means of which the bottles leaving the warm solution in the preliminary soaking tank can be rapidly heated without danger of breakage, because of the low specific heat of steam. The steam may be admitted into the chamber 19 through a suitably located inlet 19′. By reason of the water seal at the lower end of the steam compartment, this compartment can be maintained steam tight regardless of whether the horizontal tank 15 is of open or closed construction.

The main soaking tank or soaker comprises a plurality of soaking compartments 20, through which the bottle conveyor passes in a series of reversely-directed descending and ascending flights by means of which the bottles enter and leave the successive compartments, the bottle conveyor being carried and guided on wheels or sheaves 21. In the sinuous travel of the conveyor through the soaker, the bottles are thoroughly agitated, and to further increase the agitating action rotating agitators 22 are placed in one or more of the compartments. Guard plates 23 are arranged in each compartment of the soaker to prevent the bottles from leaving the conveyor, and the walls of the compartments at the discharging ends thereof are provided with extensions 24 at their upper portions in order that the solution discharged from the inverted bottles leaving a compartment will be returned to the same compartment. The labels and other foreign matter collecting in the soaking compartments 20 may be removed through hand-holes or clean-outs 25 at the bottoms of these compartments. The solutions in the preliminary soaking compartment 15 on floor B and in the main soaking compartments 20 on floor A are maintained at a suitable temperature by means of steam pipes 26. The steam pipes 26 in the shallow horizontal preliminary soaking tank 15 are arranged along the top walls of the tank.

The bottle conveyor after leaving the soaker on floor A enters its upper horizontal flight heretofore noted. This flight of the conveyor is intermittently moved, step by step, by any suitable means such as that described in the above noted United States Letters Patent No. 1,429,960. In this intermittently moving flight of the conveyor the bottles are rinsed and raised out of the conveyor pockets and projected between rotary cleaning brushes 27, as described in the above noted patent. Following the outside cleaning operation, the bottles are internally cleaned by means of rotary brushes 28 inserted therein after the bottles are thoroughly rinsed, as more particularly shown and described in the above noted patent. The inverted bottles are then allowed to drain during the remainder of their travel and are practically dry by the time they are discharged at the unloading station on floor A by the unloading device 14.

By means of the invention, it is possible to construct a bottle washing machine of the high output type having greatly increased soaking capacity without requiring additional floor space in length, and the amount of idle conveyor chain is substantially reduced.

What we claim as new and desire to secure by Letters Patent is:

1. In a bottle cleaning machine, the combination of a soaker arranged on one floor, a bottle conveyor passing through said soaker and including a flight leading to said soaker and arranged on a floor below said soaker, a soaking tank arranged on the lower floor and through which said conveyor flight passes for effecting a preliminary soaking operation, said bottle conveyor including a rising flight leading from said soaking tank to said soaker, and a steam chamber enclosing said rising conveyor flight and at its lower end having a water seal at said soaking tank.

2. In a bottle cleaning machine, the combination of a soaker arranged on one floor, a bottle conveyor passing through said soaker and including a flight leading to said soaker and arranged on a floor below said soaker, a soaking tank arranged on the lower floor and through which said conveyor flight passes for effecting a preliminary soaking operation, said soaking tank having openings adjacent opposite ends through which the conveyor enters and leaves said tank, said conveyor including a flight leading from said soaking tank to said soaker on the floor thereabove, and a steam chamber through which said last-named conveyor flight passes, said steam chamber having a water seal at the discharge end of said soaking tank.

3. In a bottle cleaning machine, the combination of a pair of soaking compartments arranged one below the other and connected by a steam chamber having liquid seals at both of said soaking compartments, and an endless bottle conveyor passing successively through said soaking compartments and including a connecting flight passing through said steam chamber for heating the bottles in the conveyor in their passage therein.

4. In a bottle cleaning machine, the combination of a soaker, a bottle conveyor passing through said soaker and including a flight disposed therebelow, a soaking tank arranged below said soaker and receiving therein said conveyor flight, said bottle conveyor including a rising flight leading from said soaking tank to said soaker, said soaking tank having an upwardly projecting well through which said rising flight leaves said tank, and a steam chamber through which said rising conveyor flight passes on its way to the soaker and having a liquid seal at said well.

5. In a bottle cleaning machine, the combination of a soaker, an endless bottle conveyor passing through said soaker and including a flight leading to said soaker and disposed therebelow, a soaking tank below said soaker through which said conveyor flight passes, said soaking tank including upwardly projecting liquid-containing wells at opposite ends to present passages through which the conveyor enters and leaves said soaking tank in respective descending and ascending flights, and a chamber enclosing said ascending conveyor flight and communicating with said soaker, said chamber having a lower liquid seal at the adjacent well and an upper liquid seal at said soaker.

6. In a bottle cleaning machine, the combination of a soaker, an endless bottle conveyor passing through said soaker and including a flight leading to said soaker and disposed therebelow, a soaking tank disposed below said soaker and through which said conveyor flight passes, said soaking tank having an end portion extending beyond the superposed soaker and at which the conveyor leaves said soaking tank in an ascending flight leading to said soaker, and a chamber enclosing said ascending conveyor flight and having a lower liquid seal at said soaking tank and an upper liquid seal at said soaker.

In testimony whereof, we affix our signatures.

GEORGE J. MEYER.
GEORGE L. N. MEYER.